United States Patent [19]
Smith et al.

[11] Patent Number: 6,114,977
[45] Date of Patent: Sep. 5, 2000

[54] KEYBOARD CALCULATOR SYSTEM

[75] Inventors: Philip E. Smith, Toronto; Grant M. Hallman, Thornhill, both of Canada

[73] Assignee: Unilogic Systems Keyboard Technologies, Inc., Ontario, Canada

[21] Appl. No.: 08/813,660

[22] Filed: Mar. 7, 1997

[51] Int. Cl.[7] .................................................. H05K 5/02
[52] U.S. Cl. .................. 341/22; 341/20; 364/709.12; 364/709.1; 705/30
[58] Field of Search .................. 341/20, 22; 364/709.12, 364/709.1; 345/169, 168; 400/78; 705/30; 379/368

[56] References Cited

U.S. PATENT DOCUMENTS

| | | | |
|---|---|---|---|
| 3,920,979 | 11/1975 | Kilby et al. | 364/705.02 |
| 3,940,758 | 2/1976 | Margolin | 345/169 |
| 3,995,123 | 11/1976 | Wilson | 379/368 |
| 4,527,917 | 7/1985 | Ueno | 400/70 |
| 4,553,219 | 11/1985 | Ueno | 364/705.01 |
| 4,623,965 | 11/1986 | Wing | 705/33 |
| 4,763,356 | 8/1988 | Day | 379/368 |
| 4,910,697 | 3/1990 | Lapeyre | 364/709.16 |
| 5,144,302 | 9/1992 | Carter et al. | 341/20 |
| 5,370,466 | 12/1994 | Kimura | 705/30 |
| 5,412,586 | 5/1995 | Oldfather | 364/709.12 |
| 5,442,152 | 8/1995 | Huang | 200/345 |
| 5,528,235 | 6/1996 | Lin | 341/22 |

OTHER PUBLICATIONS

Jul. 1997 edition of PC Magazine.
(1) Focus Electronic Co. Ltd. (Homepage); (2) Programmable Keyboard FK9000 Brochure; (3) Focus Electronic Keyboard Brochure; (4) How To Use The KeyBoard Brochure; (5) Sophiscated Circuits Power Pad Brochure; (6) How To Use The Keyboard Brochure; and (7) Search Results (No dates avail.).

*Primary Examiner*—Brian Zimmerman
*Assistant Examiner*—Albert K. Wong
*Attorney, Agent, or Firm*—Fitzpatrick, Cella, Harper & Scinto

[57] ABSTRACT

A keyboard for use with a computer. The keyboard has an alphanumeric keypad with alphanumeric keys, a calculator keypad with calculator keys including numeric and arithmetic keys which also function as the standard number pad on a calculator, a keypad matrix, a processor and a bi-directional communications interface. The processor, through the keypad matrix, receives signals indicating actuation of the keys, resolves keystrokes corresponding to the actuated keys, and sends the keystrokes to the computer through the communications interface. The keyboard has a tape mode, a calculator mode and a keyboard mode. The processor, keypad matrix and calculator keypad act as a discrete calculator when in calculator mode. There is a send key for sending a number active in the calculator to the computer as a series of keystrokes for display on the monitor. In tape mode, the processor sends keystrokes to the computer corresponding to intermediate steps in calculations entered at the calculator keypad. The keyboard has its own LCD display for displaying the calculations of the calculator. There is a software program for use on the computer to display a display window on the monitor. A signal is sent to the keyboard to enter tape mode when the software program becomes active. When the software program is active, keystrokes representing the intermediate steps of the calculation are received from the keyboard and displayed on the monitor. A signal is sent from the computer to the keyboard to exit tape mode when the software program becomes inactive.

3 Claims, 7 Drawing Sheets

| User Calculator Key Input | Calc display 11 shows | Packet sent to Computer 1 when Operator key input | Display window 47 shows | |
|---|---|---|---|---|
| | | | On Tape 49 | On Running Total Window 51 |
| 1 | 1 | | | |
| 2 | 12 | | | |
| + | 12 | ^12+\12v | 12 | 12 |
| 3 | 3 | | 12 | 12 |
| 4 | 34 | | 12 | 12 |
| − | 46 | ^34-\46v | 12 +34 | 46 |
| 5 | 5 | | 12 +34 | 46 |
| = | 41 | ^5=\41v | 12 +34 −5 =41 | 41 |

FIG. 9

KEYBOARD CALCULATOR SYSTEM

FIELD OF THE INVENTION

The invention relates to devices for inputting information into computer systems. More particularly, the invention relates to keyboard and calculator devices for such input.

BACKGROUND OF THE INVENTION

Many computer users want to make numerical calculations and use the results in their computer applications; for example, in accounting applications, spreadsheets, databases and word processing documents. Many users keep a calculator at their workstation to perform the calculation. They input the result using the computer keyboard number keys on a standard computer keyboard or on the number pad available on most computer keyboards.

Many products have been created for users that frequently work with numerical calculations. There are a number of on-screen calculators (for example, the Calculator accessory supplied with Windows™ by Microsoft). These are software-only products that simply implement the functions of a calculator using the number keys of the standard keyboard or number pad, mouse and the computer display. On-screen calculators are an improvement over the discrete calculator as the results can be cut and pasted from the software calculator program into another software program for further use; however, they are often slow and cumbersome to use.

Keyboards are available that have a calculator-type LCD display incorporated above the number pad. The keyboards allow the user to select a calculator mode for the number pad. In the calculator mode, the number pad operates using the LCD display entirely separately from the keyboard and the computer. Any data the user wishes to input into the computer must be manually reentered utilizing the keyboard in its normal way. Calculators are also available which are separate stand-alone devices, and some of these are capable of sending data to a computer, via a cable or infra-red link and custom interface hardware and software for the computer, separately from the keyboard.

It is an object of the invention to provide alternative means of entering calculated numerical information into computers.

SUMMARY OF THE INVENTION

In a first aspect the invention provides a keyboard for use with a computer. The keyboard has an alphanumeric keypad with alphanumeric keys, a calculator keypad with calculator keys, a keyboard matrix, a processor and a communications interface. The processor, through the keyboard matrix, receives signals indicating actuation of the alphanumeric keys and the calculator keys. The processor resolves keystrokes corresponding to the actuated keys and sends keystrokes to the computer through the communications interface. The keyboard has a calculator mode and a keyboard mode. The processor, keyboard matrix and calculator keypad act as a discrete calculator when in calculator mode and as numeric keys when in keyboard mode.

The calculator keys may include a send key for sending, upon actuation of the send key and when the keyboard is in calculator mode, a number active in the calculator to the computer from the processor through the communications interface as a series of keystrokes without actuation of other keys on the keyboard.

The communications interface may be a bi-directional communications interface. The keyboard may also have a tape mode. In tape mode, the processor sends keystrokes to the computer corresponding to intermediate steps in calculations entered at the calculator keypad.

The keyboard may also have a display for displaying the calculations of the calculator.

In a second aspect the invention provides a software program for use in a computer having a monitor and a keyboard with a tape mode and a keyboard mode. The keyboard sends keystrokes representing intermediate steps in a calculation to the computer when in tape mode and keystrokes representing numeric keys when in keyboard mode. The software program has a display window for display on the monitor. The display window displays, when the software program is active, the intermediate steps of the calculation as the steps are received from the keyboard. The software program sends a signal from the computer to the keyboard to exit tape mode when the software program becomes inactive, and sends a signal to the keyboard to enter tape mode when the software program is active.

In a third aspect the invention provides a computer system with a keyboard, a computer, a software program, and a monitor. The keyboard has a tape mode and a keyboard mode, an alphanumeric keypad with alphanumeric keys, a calculator keypad with calculator keys, a keyboard matrix, a processor and a communications interface. The processor, through the keyboard matrix, receives signals indicating actuation of the alphanumeric keys and the calculator keys, resolves keystrokes corresponding to the actuated keys, and sends keystrokes to the computer through the communications interface. The processor, keyboard matrix and calculator keypad act as a calculator when in tape mode and as numeric keys when in keyboard mode. The keyboard sends keystrokes representing intermediate steps in a calculation to the computer when in tape mode and keystrokes representing numeric keys when in keyboard mode. The software program runs on the computer and sends a signal from the computer to the keyboard through the communications interface to exit tape mode when the software program becomes inactive, and sends a signal from the computer to the keyboard through the communications interface to enter tape mode when the software program is active. The software program has a display window for display on the monitor. The display window displays, when the software program is active, the intermediate steps of the calculation as the steps are received from the keyboard.

The keyboard may also have a calculator mode. The processor, keyboard matrix and calculator keypad act as a discrete calculator when the keyboard is in calculator mode. The keyboard enters an immediately preceding mode of calculator mode or keyboard mode when the processor receives the signal from the computer to exit tape mode.

In a fourth aspect the invention provides a kit for use with a computer and a monitor. The kit has a software program and a keyboard. The keyboard has a tape mode and a keyboard mode, an alphanumeric keypad with alphanumeric keys, a calculator keypad with calculator keys, a keyboard matrix, a processor and a communications interface. The processor, through the keyboard matrix, receives signals indicating actuation of the alphanumeric keys and the calculator keys, resolves keystrokes corresponding to the actuated keys, and sends the keystrokes to the computer through the communications interface. The processor, keyboard matrix and calculator keypad act as a calculator when in tape mode and as numeric keys when in keyboard mode. The keyboard sends keystrokes representing intermediate steps in a calculation to the computer when in tape mode and keystrokes representing numeric keys when in keyboard mode. The software program runs on the computer and sends a signal from the computer to the keyboard through the communications interface to exit tape mode when the software program becomes inactive, and sends a signal from the computer to the keyboard through the communications interface to enter tape mode when the software program is active. The software program has a display window for display on the monitor. The display window displaying, when the software program is active, the intermediate steps of the calculation and a running subtotal, as the steps are received from the keyboard.

BRIEF DESCRIPTION OF THE DRAWINGS

For a better understanding of the present invention and to show more clearly how it may be carried into effect, reference will now be made, by way of example, to the accompanying drawing which show the preferred embodiment of the present invention and in which.

DETAILED DESCRIPTION OF THE PREFERRED EMBODIMENT

Figure 1:
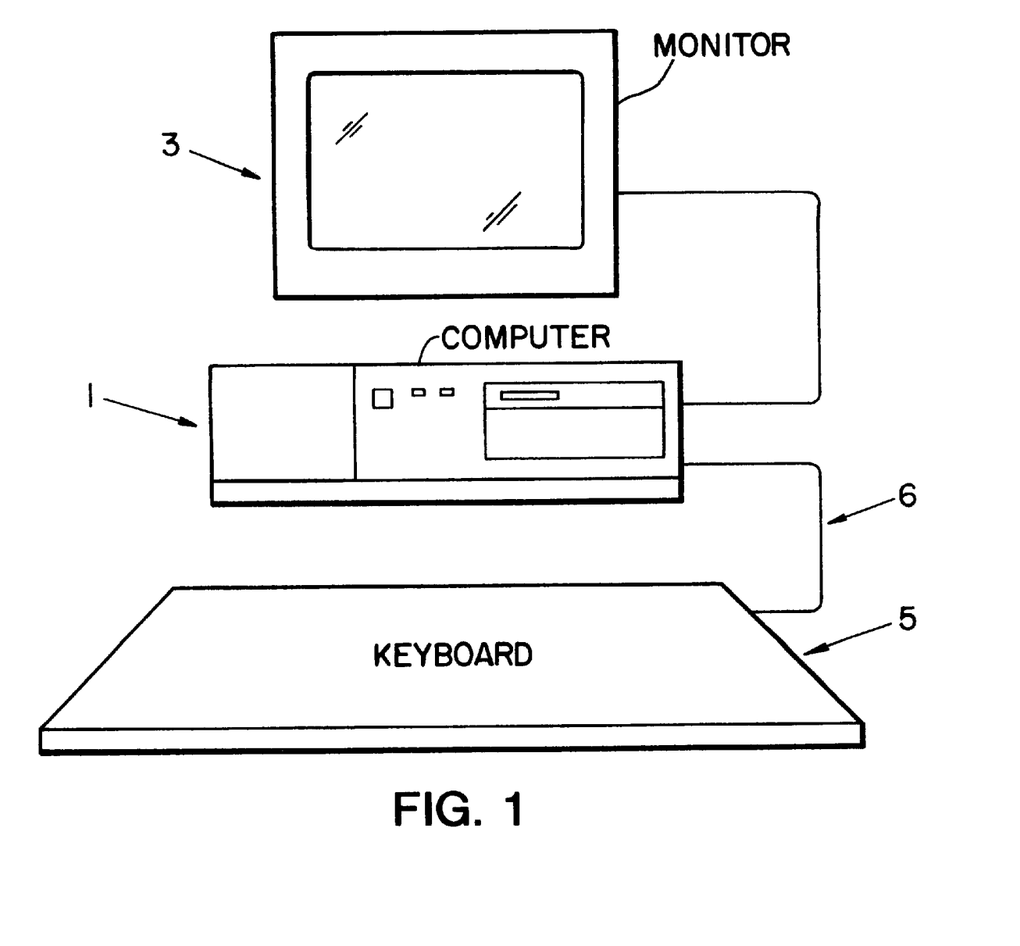
FIG. 1 is schematic view of a computer, monitor, and keyboard according to the preferred embodiment.

Referring to FIG. 1, a computer 1 is connected to a monitor 3 and a keyboard 5. The computer 1 and monitor 3 are standard units known in the art. The computer 1 is shown as a personal computer 1; although it may just as easily be a network computer or other device capable of receiving keystrokes from a keyboard 5, not shown. In this description, keystrokes refers to codes sent by a keyboard 5 to the computer 1; which codes represent the actuation of keys on the keyboard 5. As will be evident, in order to utilize some of the features of the preferred embodiment, the computer 1 needs to be able to communicate with the keyboard 5 bidirectionally.

As shown in FIG. 1, the keyboard 5 is connected to the computer 1 via a bi-directional communications interface 6, such as a standard PC/AT computer cable 6, as is used in many personal computer configurations. Other known interfaces 6 could be used, such as a PS/2 interface or an infrared interface for wireless communication, not shown.

Referring to FIGS. 2 through 5, the keyboard 5 has an integrated key cap set/top case 7 and a bottom case 9. The key cap set 7 has an alphanumeric keypad 13 and a calculator keypad 15. The alphanumeric keypad 13 contains any arrangement of alphanumeric keys as may be desired, typically these are the standard QWERTY keys 17 with numeric keys 19 above the QWERTY keys 17 and a row of functions keys 21 above those, plus direction and special input keys 23 to one side.

Figure 3:
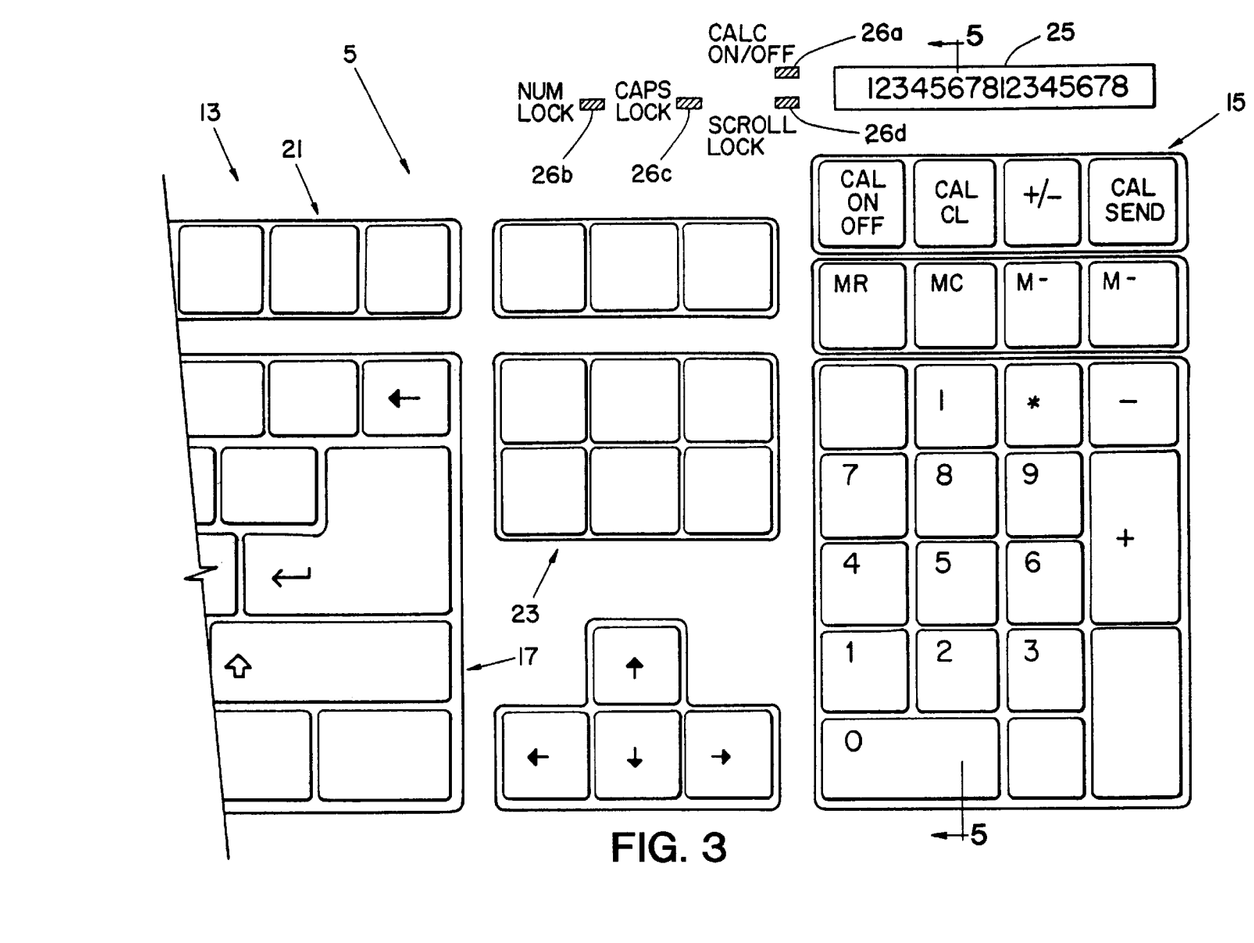
FIG. 3 is a plan view of the keyboard of FIG. 1.

The calculator keypad 15 replaces the standard number pad of a 101 key keyboard, not shown.

The calculator keypad 15 includes standard number pad keys for the digits 0–9, Num Lock, /, *,–, +, and Enter. In addition, there are eight extra keys Calc On/Off, Calc Clear, Mem–, Calc Send, Mem Rcl, Mem Clear, Mem+, and +/–.

Above the calculator keypad 15 is a display 25. The display 25 can be an LED, LCD, vacuum fluorescent or other numeric, alphanumeric or graphical display known in the art. A Calc On indicator 26a is provided alongside standard Num Lock, Caps Lock, and Scroll Lock indicators 26b, 26c, 26d.

Figure 2:
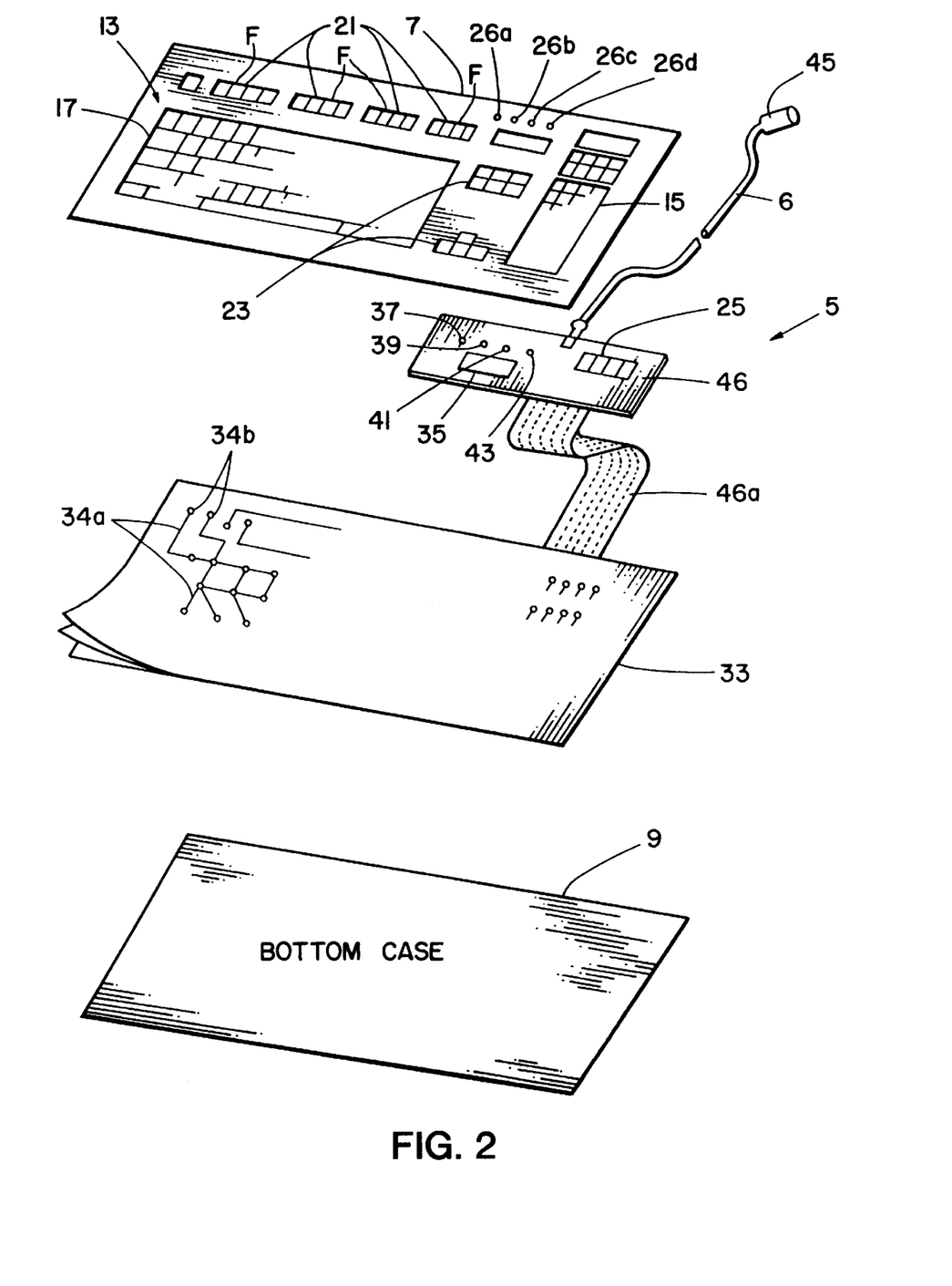
FIG. 2 is a perspective view of the keyboard of FIG. 1.
Figure 5:
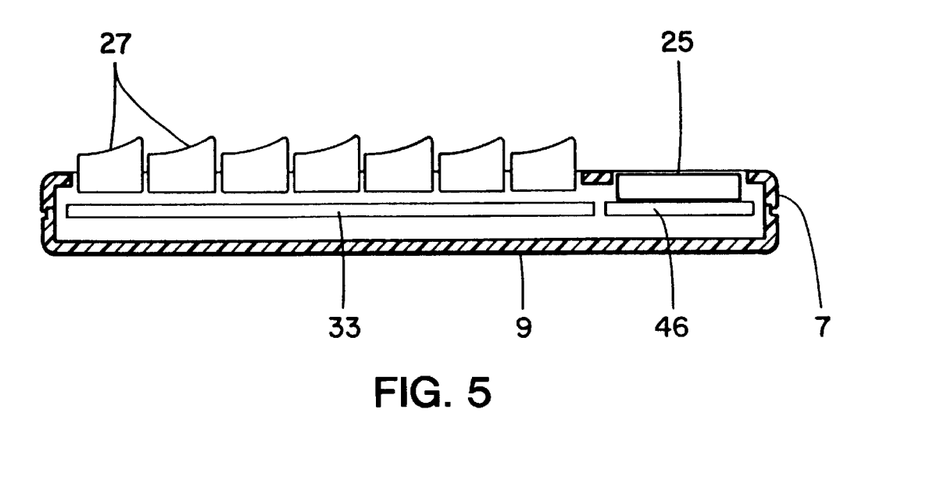
FIG. 5 is a cross-section of the keyboard of FIG. 1, through the line A–A' of FIG. 3.

Referring to FIGS. 2 and 5, the key set 7 has the keypads 13 and 15 consisting of a number of keys 27 over a membrane (mylar) keypad matrix 33. The matrix 33 utilizes a series of electrical traces 34a and and contact pads 34b that are activated by pressing one of the keys 27 to bring it into contact with a specific location on the matrix 33 to signal that location to a processor 35. Many alternate keyboard configurations are known in the art, such as printed circuit board and mechanical switch based keyboards or touch-sensitive plates including optical, infra-red or acoustic pickup, not shown. Any of these alternate keyboard configurations could be adapted by a person with ordinary skill in the art to utilize the principles described herein.

Figure 4:
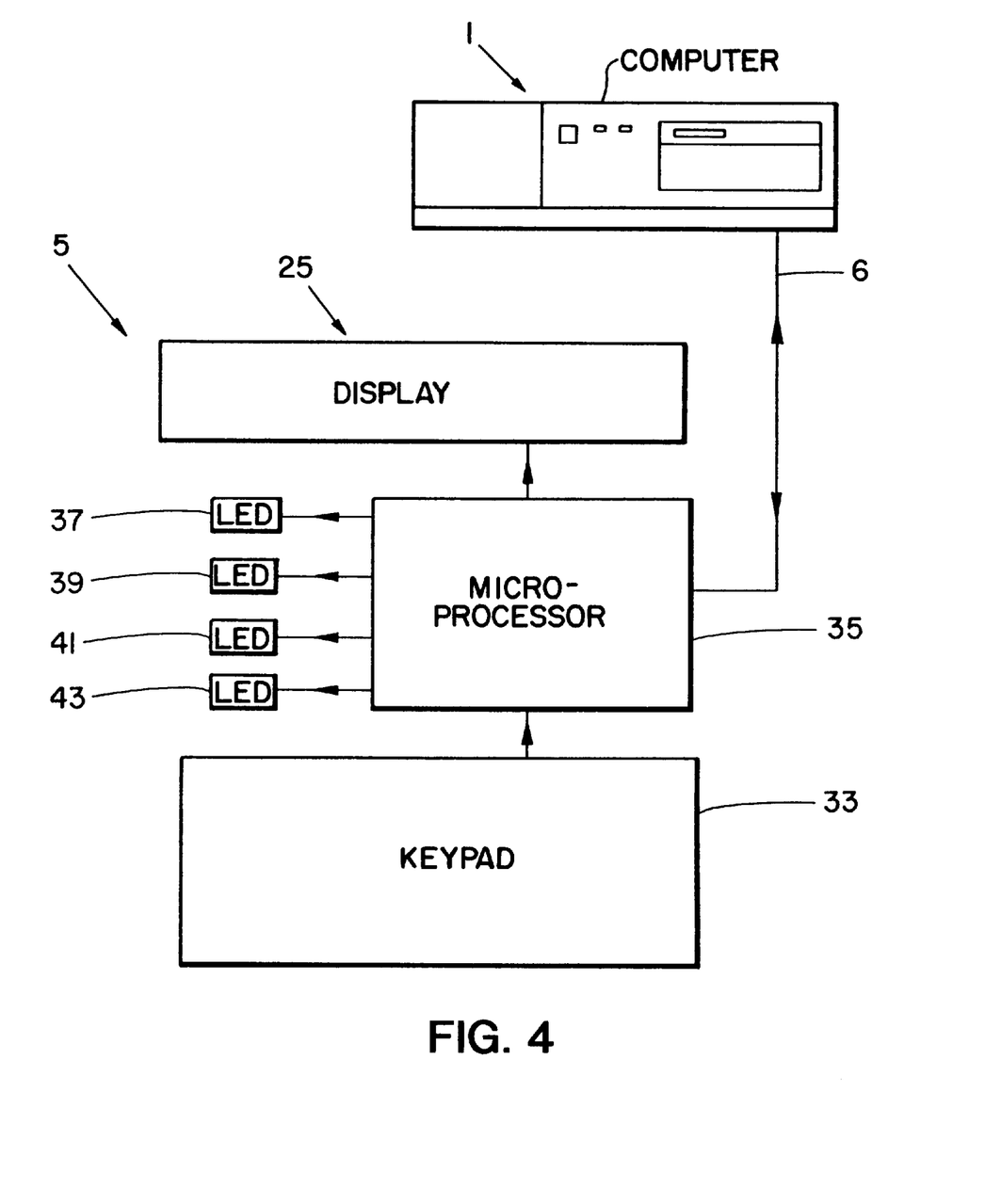
FIG. 4 is a block diagram of the internal components of the keyboard of FIG. 1.

The keyboard matrix 33 connects both the keypads 13 and 15 to the processor 35. The processor 35 is used to decode which key of the keypads 13, 15 has been selected by a user, and to forward the appropriate signal, i.e. keystroke, to the computer 1 through the cable 6.

Instructions stored in the processor 35 are also used in conjunction with the calculator keypad 15 to implement a calculator. The instructions required to implement the functions of the calculator are stored in the memory of the processor 35. Sample functions will be described later in this description. The calculator also uses the memory of the processor 35 for storage space for intermediate calculations and calculator memory functions.

By utilizing a single keyboard matrix 33 and processor 35 for both keyboard and calculator functions, the cost and complexity of the keyboard can be considerably reduced over prior calculator/keyboards.

A user can use the keyboard 5 in different modes; Keyboard Mode and Calculator (or Calc) Mode.

Keyboard Mode is the default mode and the keyboard 5 operates as a standard keyboard in all functions in Keyboard Mode, until the Calc On/Off key is pressed. At that point, the Calc ON indicator 26a lights, indicating Calc Mode. While in Calc Mode, the keyboard 5 continues to operate as a standard keyboard for the alphanumeric keypad 13 separate from the calculator keypad 15. The calculator keypad 15 is now dedicated to function as a local arithmetic calculator having the standard four functions of add, subtract, multiply and divide plus memory. Other functions could be included in the calculator keypad 15 and the calculator, such as full scientific functions or accounting/business functions or other similar stand-alone dedicated calculator functions depending on the desired functions for a particular user segment and the memory capacity and capabilities of the processor 35.

During Calc Mode, pressing the Calc Send key causes the keyboard 5 via the processor 35 to transmit to the computer 1, through the cable 6 and without actuation of any other key, keystrokes corresponding to the number currently being displayed on the display 25 to the computer 1 exactly as though the number had been entered as actuated keys at a standard keyboard. For greater clarity, a number refers to a string of numeric characters, decimal point and possibly minus or other mathematical symbols which represent the numerical result of the calculation or numbers used in a calculation. The keyboard 5 is compatible with any software application that can receive numeric keystrokes, and the number sent will be passed to any such application as if it had been entered at a standard keyboard. This is a significant advantage. The results of numerical calculations do not have to be separately re-entered in Keyboard Mode; the results are directly entered into the computer 1 by the touch of a single key.

To return from Calc Mode to normal mode, the user need only press the Calc On/Off key a second time. The Calc On indicator 13 will be extinguished.

Referring to FIGS. 2 and 4, the keyboard 5 may be implemented using a microprocessor 35 connected to a keypad matrix 33, four LEDs 37, 39, 41, 43, the LCD display 25 and a cable 6 for connection to a computer 1. The display 25, LEDs 37, 39, 41, 43 and processor 35 are mounted on a printed circuit board 46 connected to the matrix 33 via a ribbon cable 46a which may be an extension of the keyboard matrix 33. The LEDs provide illumination for the indicators 26a, 26b, 26c, 26d, respectively.

The processor 35 is any processor 35 capable of implementing the described functions, such as a SMOS 4-bit, Intel 8049 or 8051, Hitachi 6303, Zylog Z8, Motorola 6805 or 6811, or other similar microcontrollers. These processors 35 are often used to implement standard keyboards and have sufficient additional capacity to handle the additional inputs from the calculator keypad 15 required by the configuration described herein. If additional or different calculator functions are desired then a processor 35 with additional capacity may be required. There are many available as will be understood by those skilled in the art.

In addition to resolving the matrix 33 address for each key 27, the processor 35 also has code necessary to implement the calculator functions of the calculator, such as/(division), * (multiplication), -(subtraction), +(addition), Mem- (Memory subtraction), Mem+(Memory addition), Mem Clear (clear memory), Mem Rcl (Memory recall), Calc Clear (Clear calculator), and +/-(change the sign of the number currently displayed) and to transmit the keystrokes representing the displayed number and intermediate calculation steps to the computer 1, appropriate to the mode of operation.

The keypad matrix 33 may be printed circuit membrane switches 34b (see FIG. 2) formed in a manner known in the art that are activated by pressing a key 27 on the keyboard 5. Although only one input is shown from the matrix 33 to the processor 35, there are typically a number of lines. The pressing of any key 27 on the keyboard 5 will cause the matrix 33 to activate two of those lines. The combination of the two lines indicates to the processor 35 which key 27 has been pressed. In the implementation shown, 114 different keys 27, and 114 matrix 33 nodes, are used and the matrix 33 has 10×15 lines for 150 possible nodes. The processor 35 must be able to receive the 114 nodes used. Of course, for more keys 27 (and thus, more functions), more matrix nodes and a bigger processor 35 may be required.

The four LEDs 37, 39, 41, 43 provide illumination for the indicators 26 of FIG. 3. The indicators 26 could use other indicator sources, such as LCDs or other known indicator sources. Similarly, other displays, such as an LED display, not shown, could be used for the display 25. A 10 digit display with +/-capabilities is usually sufficient. A display with more digits, with alphanumeric or graphic capability, for example to provide more detailed user messages, could also be used. The messages could be items such as "divide by zero" or "comm error 19".

As mentioned previously, the interface 6 may be a PC/AT interface in which case the interface would terminate in a 5-pin DIN-type connector 45; the interface 6 may be a PS/2 interface in which case it would terminate on a PS/2 type mini plug, not shown; or the interface 6 may be an optical, infrared, radio frequency or acoustic interface terminating as appropriate to the technology used as is usual in the art. There may also be a combination of interfaces through adapting one interface to another; for example, PC/AT to PS/2 adapters are existing off-the-shelf components and infrared or radio frequency interfaces accept keyboard interfaces such as a PC/AT plug.

The calculator keypad 15, display 25 and those parts of the keyboard matrix 33 and processor 35 related to the calculator keypad 15 and calculator functions, when operating in Calc Mode form a calculator.

Figure 6:
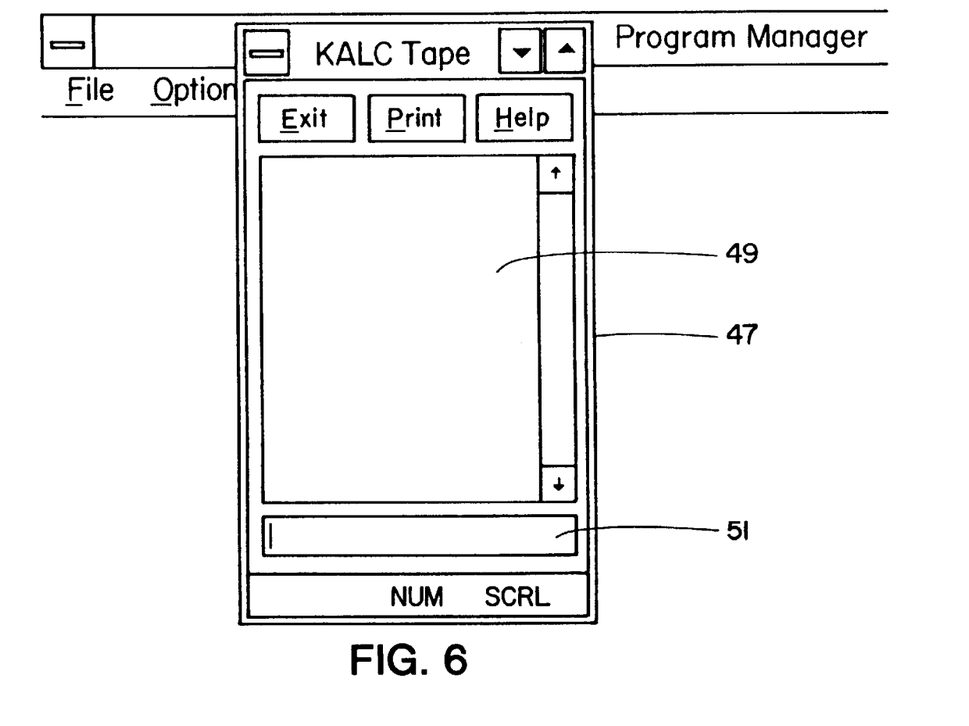
FIG. 6 is a screen display for a software application running on the computer of FIG. 1 for use in conjunction with the keyboard of FIG. 1.

Referring to FIG. 6, in a further embodiment, the keyboard 5 also supports a "Tape Mode". This mode is used in conjunction with a calculator tape software program, known as KTAPE, running on the computer 1. In the preferred embodiment, KTAPE works in the Windows™ environment and is compatible with versions 3.1, 95 and others. It could also be implemented in PC-DOS, MS-DOS, DR-DOS, OS/2, PS/2 or a variety of other operating systems for PC's, Apple™, Sun Microsystems, or other similar individual or networked computing platforms by a person skilled in the art using the principles described herein.

When KTAPE is activated and has application focus, it sends a signal from the computer 1 to instruct the keyboard 5 to enter Tape Mode. The signal used in the preferred embodiment is to turn on the Scroll Lock function of the keyboard 5 in a manner known in the art. This signal is received by the processor 35 and the processor places the keyboard in Tape Mode. In Tape Mode, the keyboard 5 operates as in Calc Mode except that intermediate steps of the calculation, including arithmetic functions, are sent to the computer 1, received by the KTAPE application and displayed by it on the monitor 3 in a display window 47 with a portion in a tape 49 format similar to a printer tape of a printing calculator. There is a running total window 51 at the bottom of the display window 47. KTAPE can also be instructed to print the data.

Intermediate calculations are sent as a preamble character, a decimal string, an arithmetic operator, a field delimiter, a result string, and a postamble character. In the preferred embodiment, the preamble character used is an up arrow keystroke, the field delimiter is a backslash keystroke, and the postamble character is a down arrow keystroke, although the other keystrokes could be used in these roles as would be evident to a person skilled in the art. KTAPE receives this data and displays it on the monitor 3 using standard Windows objects. Once displayed on the monitor 5, the data may then be printed or otherwise accessed via standard Windows tools. Similar functions may be carried out on other software platforms, operating system environments, and programming languages.

KTAPE is responsible for maintaining a display window on screen, showing the intermediate steps of a calculation done on the calculator of keyboard 5, in a format similar to the paper tape of a printing calculator. KTAPE is implemented using, where possible, display objects or features which are standard to the computer and operating system platform being used on the computer 1. KTAPE operates in conjunction with the keyboard 5, and causes the keyboard 5 to switch between modes when it is activated or becomes inactive. As discussed, the keyboard 5 supports three modes of operation when used with KTAPE. These are:

(1) Keyboard Mode—the Calc ON indicator 26a is off and the keyboard 5 operates exactly like a standard keyboard, the 8 extra keys are not used, except the Calc On/Off key permits switching of the keyboard 5 into Calc Mode.

(2) Calc Mode—the Calc ON indicator 13 is on, the alphanumeric keypad 13 operates in the same manner as in a standard keyboard, the calculator keypad 15 acts as a calculator and does not send data to the computer, except when the Calc Send key is pressed and keystrokes representing the the contents of the display 25 are sent to the computer 1.

(3) Tape Mode—the Calc ON indicator 13 is flashing, the alphanumeric keypad 13 does not operate, the calculator keypad 15 operates as a calculator and sends intermediate calculations to the computer 1.

When KTAPE becomes active, for example by being activated by the user via a mouse click, it instructs the computer 1 to signal the keyboard 5 through the bi-directional communications interface 6 to switch to Tape Mode. The signal is sent as the "Scroll Lock On" command from the computer 1 to the keyboard 5. When KTAPE becomes inactive, typically by losing focus to another software application or being terminated or minimized, it signals the keyboard 5 to return from Tape Mode to the previous mode. In order to implement this feature, the previous mode is always stored in memory and used to return the keyboard 5 to that mode when Tape Mode is turned off. This saves the user the burden of turning on Tape Mode manually as well as activating KTAPE and turning off tape mode manually when deactivating KTAPE. The Tape Mode off signal is sent as "Scroll Lock Off" to the keyboard 5 from the computer 1 and is received by the processor 35. The Scroll Lock command was selected for this signal because it is already supported by existing operating systems and associated keyboard drivers, and the activation of Scroll Lock via software from the computer 1 is not typically utilized by software applications, so conflicts are minimized. If Scroll Lock is activated or deactivated via the Scroll Lock key on the keyboard, this action does not alter the mode of the keyboard 5 as the processor 35 responds to unsolicited Scroll Lock commands coming from the computer 1 through the bi-directional communications interface 6 without having immediately prior sent the Scroll Lock keystrokes to the computer 1. The activation signal could also be implemented using some other computer-to-keyboard function or a custom-implemented function, provided it does not interfere with other functions of the software or the keyboard 5.

The KTAPE display window is shown amongst other windows. These windows are only shown for background as a user might see them while running other unrelated programs.

Tape Mode is activated when the keyboard 5 receives an unsolicited "scroll lock on" from the computer 1. The current state (Calc ON or OFF) is saved and the CalcOn light 26a flashes while in Tape Mode. When an unsolicited "scroll lock off" signal is received by the keyboard 5 from the computer 1, the keyboard 5 exits Tape Mode and returns to the previously saved state.

When in Tape Mode and an operator key, such as −, +, =, RCL, is input, the preceding entries at the calculator pad 15 are simply sent by the keyboard 5, without actuation of any other key, as keystrokes in a packet of data with the following form:

<Preamble><Entry><Operator><Delimiter><Display><Postamble>, where:

<Preamble> is an <up arrow>;

<Entry> is the current number entered since the last operator, e.g. "12";

<Operator> one of the following keys, which are translated to a marker character as follows: the <+> key is sent as "+" character, <−> as "−", <*> as "*", </> as "=", <=>as "=", <Mem+> as "i" (increment), <Mem−> as "d" (decrement), <+−> as "s", (sign change), <Recall> as "r", <MemClr> as "m", <Clear> as "c";

<Delimiter> is a <backslash>;

<Display> is the characters currently in the display window after the current calculation is completed; and <Postamble> is <Down arrow>.

Figure 7:
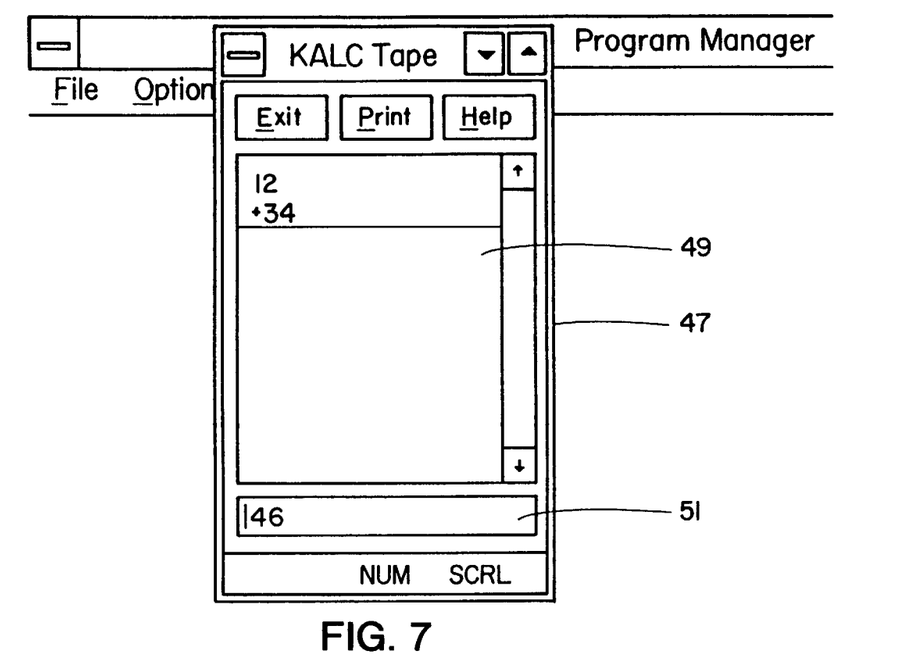
FIGS. 7 and 8 are screen displays for the application of FIG. 6 displaying a simple calculation.
Figure 8:
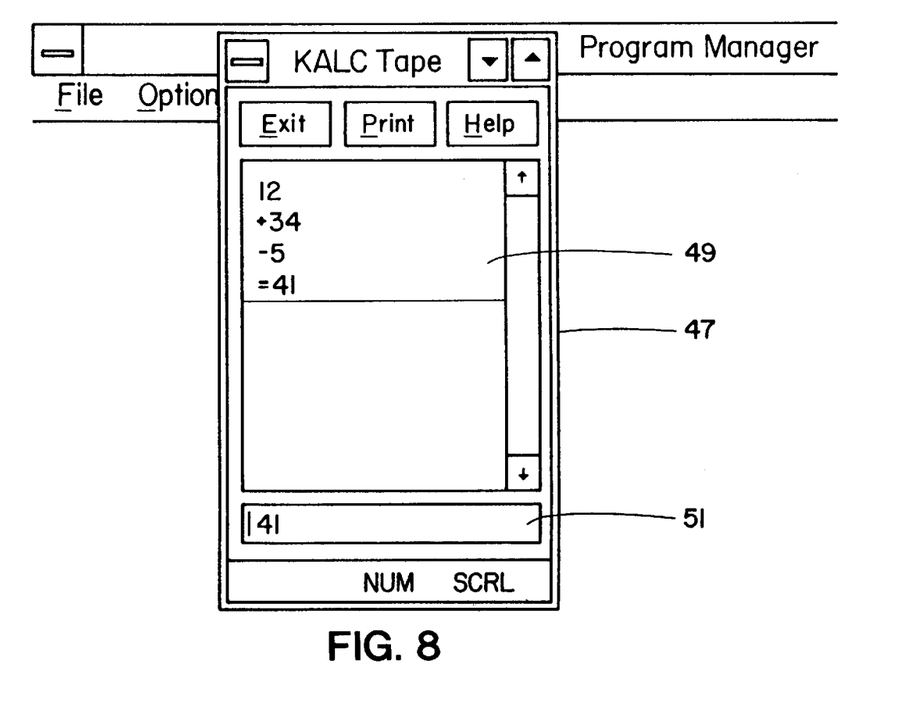
Figure 9:
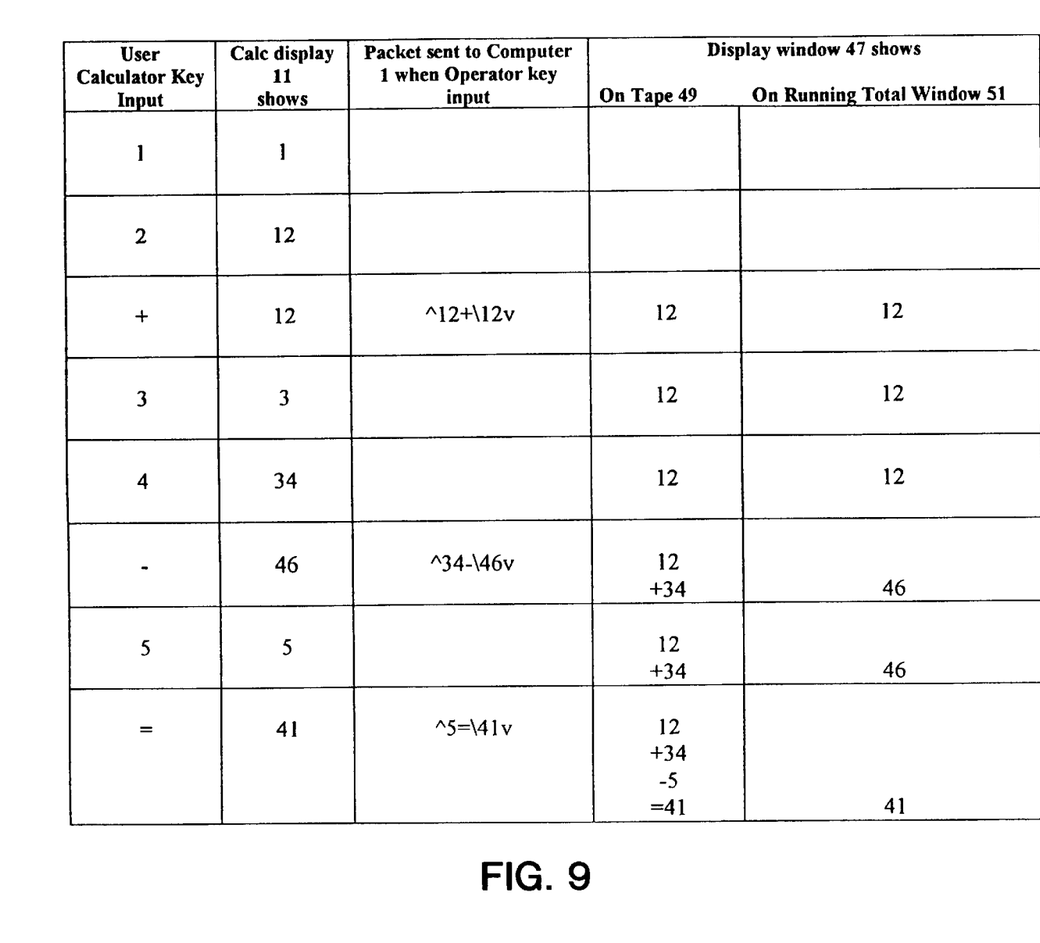
FIG. 9 is a table showing various activities occurring during the calculation of FIGS. 7–8.

Referring to FIGS. 7–8, an example calculation of 12+34−5=41 is shown in the display window 47 for the KTAPE application. The table in FIG. 9 describes various activities occurring during the calculation. In FIG. 10, ˆ is an up arrow, while, v is a down arrow. This communication could be implemented in a number of different ways using techniques of message formatting, packetizing, confirmation, error correction, encryption and other similar security features and other features typical and known to the art. The KTAPE display could also be formatted in a variety of ways so as to display the intermediate steps and results of the calculation to the user.

KTAPE also supports a Print function. When this function is activated, KTAPE prints on hard copy (using the default printer if available) all currently highlighted lines of intermediate data. Lines of data may be highlighted manually, or the user may accept the lines which have been highlighted automatically as follows. As a line of intermediate data is displayed in a column entry, it is highlighted. Successive lines are also highlighted, until the = operator character is received. When the next line after the = operator is received, all previously highlighted continue to be displayed, but are not highlighted, and the next line is highlighted. If the user desires the previous lines can be manually highlighted.

Thus KTAPE automatically highlights for printing all intermediate data between uses of the "=" function, typically representing a complete chain of calculations. This automatic highlighting technique could also be implemented based on other trigger characters different from or in addition to the = character, based on the user's perception of convenience. KTAPE also supports a Help function which displays text intended to assist the user.

It will be understood by those skilled in the art that this description is made with reference to the preferred embodiment and that it is possible to make other embodiments employing the principles of the invention which fall within its spirit and scope as defined by the following claims.

We claim:

1. A keyboard for use with a computer, the keyboard comprising:

an alphanumeric keypad with alphanumeric keys, a calculator keypad with calculator keys, a keyboard matrix, a processor, and a communications interface, wherein the processor, through the keyboard matrix, (i) receives signals indicating actuation of the alphanumeric keys and the calculator keys, (ii) resolves keystrokes corresponding to the actuated keys, and (iii)

sends keystrokes to the computer through the communications interface, and wherein the keyboard has a calculator mode and a keyboard mode, the processor, keyboard matrix and calculator keypad acting as a discrete calculator when in calculator mode and as numeric keys when in keyboard mode, wherein the calculator keys comprise a send key for sending, upon actuation of the send key when the keyboard is in calculator mode, a number active in the calculator to the computer from the processor through the communications interface as a series of keystrokes without actuation of other keys on the keyboard.

2. The keyboard of claim 1, wherein the communications interface comprises a bi-directional communications interface and the keyboard further comprises a tape mode, wherein the processor sends keystrokes to the computer corresponding to intermediate steps in calculations entered at the calculator keypad.

3. The keyboard of claim 2, further comprising a display for displaying the calculations of the calculator.

* * * * *